(12) United States Patent
Komori

(10) Patent No.: US 11,938,879 B2
(45) Date of Patent: Mar. 26, 2024

(54) VEHICLE CONTROL DEVICE, INFORMATION PROCESSING APPARATUS, OPERATION METHODS THEREOF, AND STORAGE MEDIUM

(71) Applicant: HONDA MOTOR CO., LTD., Tokyo (JP)

(72) Inventor: Kenji Komori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/950,529

(22) Filed: Sep. 22, 2022

(65) Prior Publication Data

US 2023/0112688 A1 Apr. 13, 2023

(30) Foreign Application Priority Data

Sep. 29, 2021 (JP) ................................ 2021-159684

(51) Int. Cl.
| | |
|---|---|
| *B60R 21/0132* | (2006.01) |
| *B60R 21/01* | (2006.01) |
| *B60R 21/0134* | (2006.01) |
| *G06T 7/20* | (2017.01) |
| *G06T 7/70* | (2017.01) |
| *G06V 20/58* | (2022.01) |

(52) U.S. Cl.
CPC ...... *B60R 21/0134* (2013.01); *B60R 21/0132* (2013.01); *G06T 7/20* (2013.01); *G06T 7/70* (2017.01); *G06V 20/58* (2022.01); *B60R 2021/01272* (2013.01); *G06T 2207/30236* (2013.01); *G06T 2207/30252* (2013.01); *G06V 2201/08* (2022.01)

(58) Field of Classification Search
CPC ............ B60R 21/0134; B60R 21/0132; B60R 2021/01272; G06T 7/70; G06T 7/20; G06V 2201/08
USPC .......................................................... 701/45
See application file for complete search history.

(56) References Cited

FOREIGN PATENT DOCUMENTS

| JP | 2009090840 A | * | 4/2009 |
| JP | 2012-180055 A | | 9/2012 |
| JP | 2012208087 A | * | 10/2012 |

OTHER PUBLICATIONS

JP-2012208087-A (Sata et al.) (Oct. 25, 2022) (Machine Translation) (Year: 2012).*
JP-2009090840-A (Takesha et al.) (Apr. 30, 2009) (Machine Translation) (Year: 2009).*

* cited by examiner

*Primary Examiner* — Mahmoud Gimie
(74) *Attorney, Agent, or Firm* — Thomas| Horstemeyer, LLP

(57) ABSTRACT

A vehicle control device that controls a vehicle, the vehicle control device comprising: an acquisition unit configured to acquire surrounding information of the vehicle; a recognition unit configured to recognize another vehicle traveling in surroundings of the vehicle, based on the surrounding information; a calculation unit configured to calculate a visual recognition ratio of a steering wheel of the other vehicle to a perfect circle; and a control unit configured to control the vehicle, based on the visual recognition ratio.

13 Claims, 7 Drawing Sheets

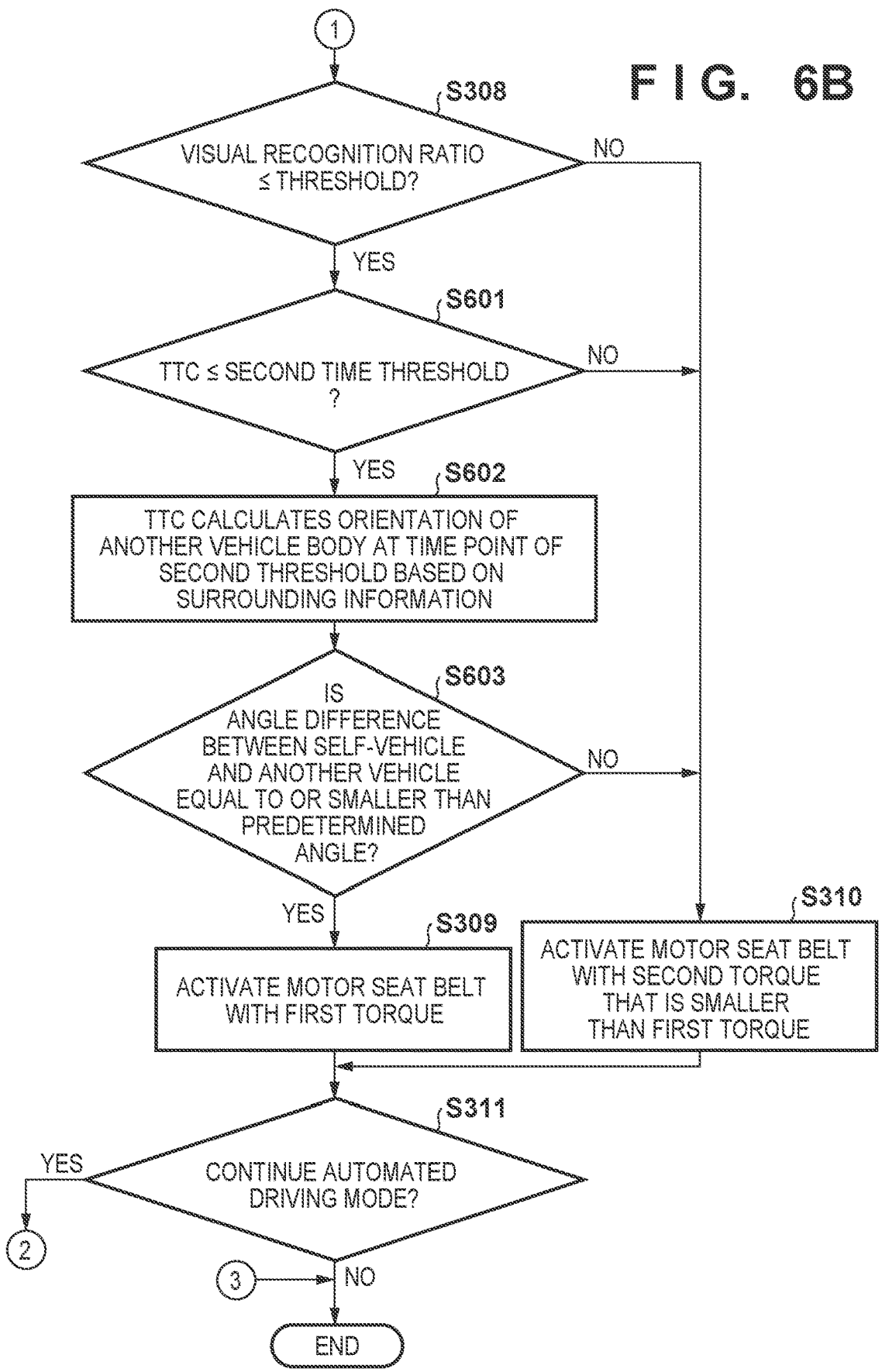

VEHICLE CONTROL DEVICE, INFORMATION PROCESSING APPARATUS, OPERATION METHODS THEREOF, AND STORAGE MEDIUM

CROSS-REFERENCE TO RELATED APPLICATION(S)

This application claims priority to and the benefit of Japanese Patent Application No. 2021-159684 filed on Sep. 29, 2021, the entire disclosure of which is incorporated herein by reference.

BACKGROUND OF THE INVENTION

Field of the Invention

The present invention relates to a vehicle control device, an information processing apparatus, operation methods thereof, and a storage medium.

Description of the Related Art

Japanese Patent Laid-Open No. 2012-180055 discloses that when it is determined that a self-vehicle has turned to the left or right, and it is determined that there is a high possibility of a collision with an object present ahead of the self-vehicle after turning to the left or right, a collision damage reducing operation for protecting occupants in the self-vehicle is conducted by controlling equipment of the self-vehicle.

However, the technique described in Japanese Patent Laid-Open No. 2012-180055 has a drawback that control in consideration of a movement of an oncoming vehicle (another vehicle) is not conducted.

The present invention has been made as an opportunity in recognition of the above drawback, and provides a technique for achieving control in consideration of a movement of another vehicle present in the surroundings of a vehicle.

SUMMARY OF THE INVENTION

According to one aspect of the present invention, there is provided a vehicle control device that controls a vehicle, the vehicle control device comprising:
 an acquisition unit configured to acquire surrounding information of the vehicle;
 a recognition unit configured to recognize another vehicle traveling in surroundings of the vehicle, based on the surrounding information;
 a calculation unit configured to calculate a visual recognition ratio of a steering wheel of the other vehicle to a perfect circle; and
 a control unit configured to control the vehicle, based on the visual recognition ratio.

BRIEF DESCRIPTION OF THE DRAWINGS

The accompanying drawings illustrating embodiments in the present invention constitute a part of the specification, and are used together with the description to describe the present invention;

FIGS. 6A and 6B are a flowchart illustrating an example of a procedure of a process performed by a vehicle control device according to a second embodiment.

DESCRIPTION OF THE EMBODIMENTS

Figure 1:
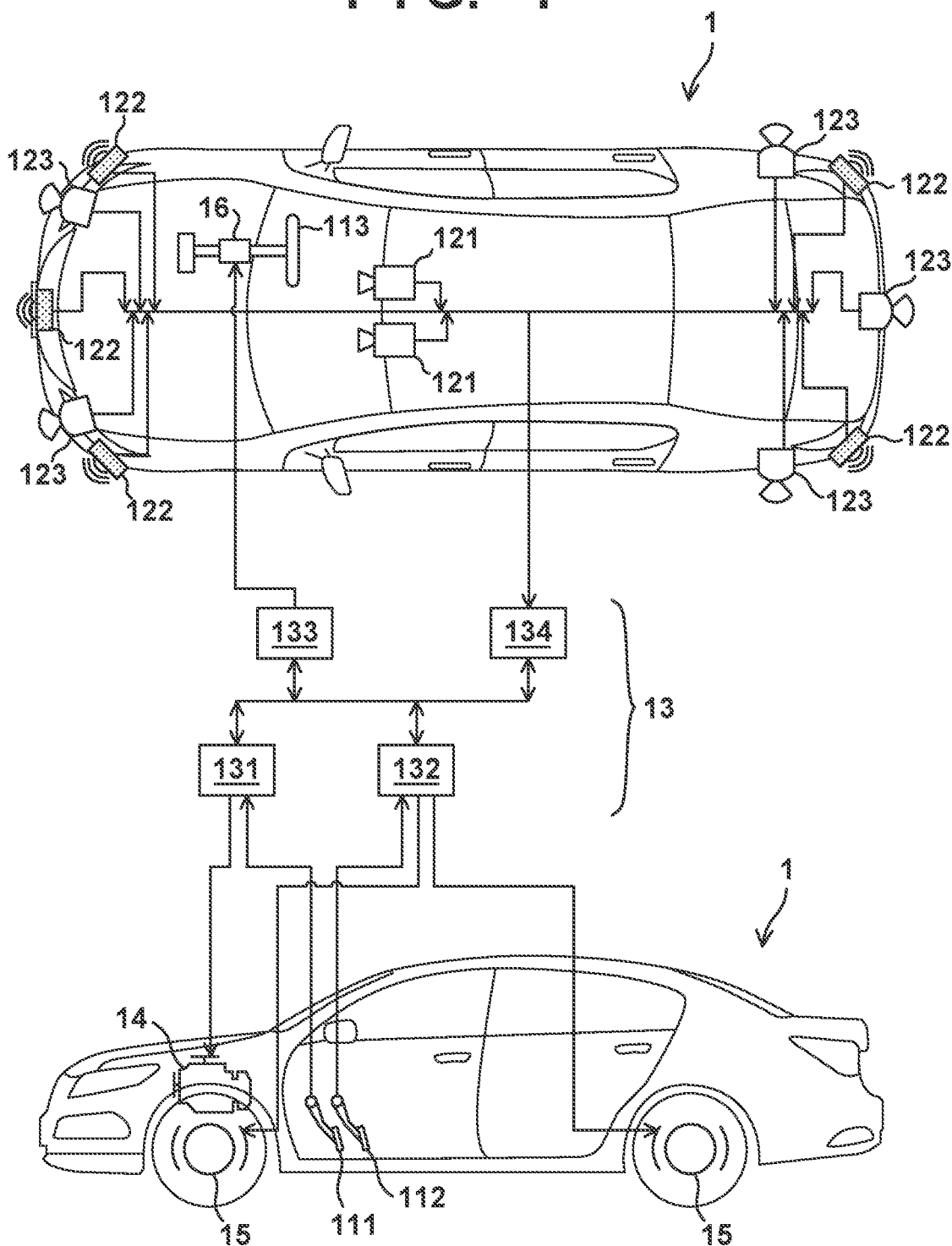
FIG. 1 is a diagram for describing a configuration example of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Vehicle Configuration>

Figure 2:
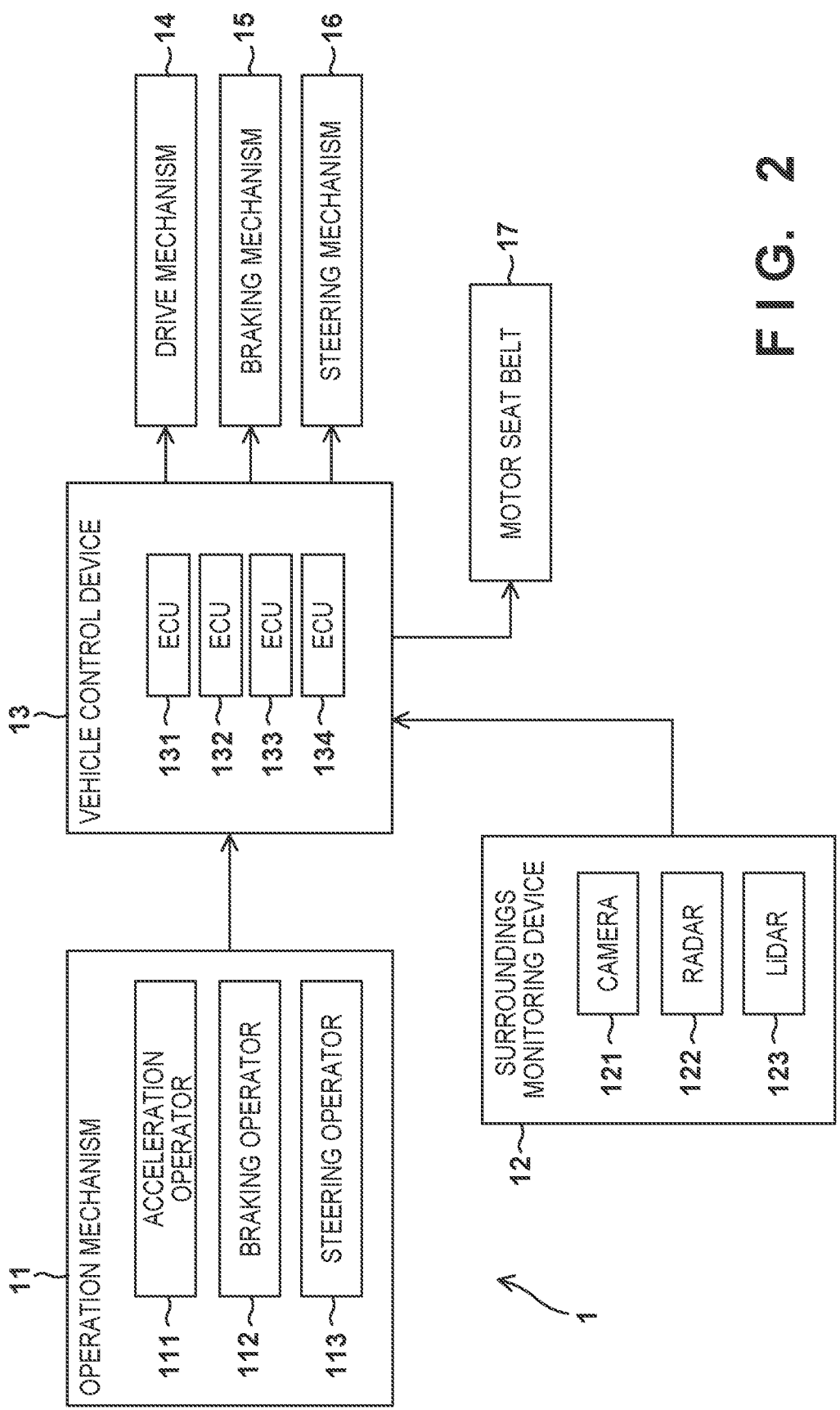
FIG. 2 is a block diagram for describing the configuration example of the vehicle according to the embodiment.

FIGS. 1 and 2 are diagrams for describing a configuration of a vehicle 1 according to a first embodiment. FIG. 1 illustrates arrangement positions of the respective elements to be described below and a connection relationship between the elements, by using a top view and a side view of the vehicle 1. FIG. 2 is a system block diagram of the vehicle 1.

In the following description, expressions such as front/rear, up/down, and lateral sides (left/right) will be used, in some cases, as expressions indicating relative directions indicated with respect to a vehicle body of the vehicle 1 as a reference. For example, the term "front" indicates the front side of the vehicle body as seen in the front-and-rear direction, and the term "upper" indicates a height direction of the vehicle body.

The vehicle 1 includes an operation mechanism 11, a surroundings monitoring device 12, a vehicle control device 13, a drive mechanism 14, a braking mechanism 15, a steering mechanism 16, and a motor seat belt 17. The motor seat belt 17 is a seat belt device equipped with a motor pretensioner. In the present embodiment, the vehicle 1 is a four-wheeled vehicle, but the number of wheels is not limited to this.

The operation mechanism 11 includes an acceleration operator 111, a braking operator 112, and a steering operator 113. Typically, the acceleration operator 111 is an accelerator pedal, the braking operator 112 is a brake pedal, and the steering operator 113 is a steering wheel. However, for these operators 111 to 113, any other type such as a lever type or a button type may be used.

The surroundings monitoring device 12 includes a camera 121, a radar 122, and a light detection and ranging (LiDAR) 123, all of which function as sensors for monitoring or detecting surrounding environments of the vehicle (self-vehicle) 1. The camera 121 is an imaging device including, for example, a charge-coupled device (CCD) image sensor, a complementary metal oxide semiconductor (CMOS) image sensor, or the like. The radar 122 is, for example, a ranging device such as a millimeter wave radar. The LiDAR 123 is, for example, a ranging device such as a laser radar. As illustrated in FIG. 1, these components are disposed at positions where the surrounding environments of the vehicle 1 can be detected, for example, on the front side, the rear side, the upper side, and the lateral sides of the vehicle body.

Examples of the surrounding environment of the vehicle 1 described above include a travel environment of the vehicle 1 and an environment in the surroundings of the vehicle 1 related thereto (extending direction of lanes, travelable areas, colors of traffic signals, and the like), and object information in the surroundings of the vehicle 1 (presence or absence of objects such as other vehicles, pedestrians, and obstacles, and attributes and positions, directions and speeds in the movement of the objects, and the like). From this viewpoint, the surroundings monitoring device 12 may be expressed as a detection device or the like for detecting and acquiring the surrounding information of the vehicle 1.

The vehicle control device 13 is configured to be capable of controlling the vehicle 1, and controls each of the mechanisms 14 to 16 and the motor seat belt 17, based on, for example, a signal from the operation mechanism 11 and/or the surroundings monitoring device 12. The vehicle control device 13 includes a plurality of electronic control units (ECUs) 131 to 134. Each ECU includes one or more CPUs, one or more memories, and one or more communication interfaces. Each ECU performs a predetermined process by the CPU based on information (data or electric signal) that has been received through the communication interface, and stores the process results in the memory or outputs the process results to another element through the communication interface. In addition, one or more memories store a program, and a part or all of the process according to an embodiment is performed by one or more CPUs reading and executing the program.

The ECU 131 is an acceleration ECU, and controls the drive mechanism 14, to be described later, based on, for example, an operation amount of the acceleration operator 111 by the driver. The ECU 132 is a braking ECU, and controls the braking mechanism 15 based on, for example, an operation amount of the braking operator 112 by the driver. The braking mechanism 15 is, for example, a disc brake provided on each wheel. The ECU 133 is a steering ECU, and controls the steering mechanism 16 based on, for example, an operation amount of the steering operator 113 by the driver. The steering mechanism 16 includes, for example, power steering.

The ECU 134 is an analysis ECU provided to correspond to the surroundings monitoring device 12. The ECU 134 functions as an information processing apparatus, performs a predetermined analysis or process based on a surrounding environment of the vehicle 1 that has been obtained by the surroundings monitoring device 12, and controls the operation of the motor seat belt 17 by use of its result. Further, the ECU 134 outputs a result of a predetermined analysis or process to the ECUs 131 to 133.

That is, the ECUs 131 to 133 are capable of controlling the mechanisms 14 to 16, based on a signal from the ECU 134. According to this configuration, the vehicle control device 13 is capable of conducting travel control of the vehicle 1 in accordance with a surrounding environment, and conducting automated driving, for example.

Herein, the automated driving means that some or all of the driving operations (acceleration, braking, and steering) are not performed by the driver, but are performed by the vehicle control device 13. That is, the concept of the automated driving includes a mode in which all of the driving operations are performed by the vehicle control device 13 (so-called fully automated driving) and a mode in which only some of the driving operations are performed by the vehicle control device 13 (so-called driving assistance). Examples of the driving assistance include a vehicle speed control (automatic cruise control) function, an inter-vehicle distance control (adaptive cruise control) function, a lane departure prevention assist (lane keeping assist) function, a collision prevention assist function, and the like.

Note that the vehicle control device 13 is not limited to the present configuration. For example, a semiconductor device such as an application specific integrated circuit (ASIC) may be used for each of the ECUs 131 to 134. That is, the function of each of the ECUs 131 to 134 are achievable by any of hardware and software. In addition, some or all of the ECUs 131 to 134 may be configured with a single ECU.

<Application Scene>

Next, an example of an application scene in the present embodiment will be described with reference to FIG. 4. The vehicle 1 is a self-vehicle, and another vehicle 2 is an oncoming vehicle of the vehicle 1. The vehicle 1 and another vehicle 2 are traveling on a curve, and the vehicle 1 is traveling in a direction indicated by an arrow 401. Reference numerals 402 and 404 denote lane markers (for example, white lines) indicating boundaries of a road, and a reference numeral 403 denotes a center line.

While traveling on a curve (in particular, while another vehicle 2, which is an oncoming vehicle, is traveling on a curve), a position detection error of another vehicle 2 increases, and a prediction error of a moving direction (moving trajectory) of another vehicle 2 also increases. For this reason, it is difficult to determine whether another vehicle 2 is turning too much on the steering wheel and moving in the direction to the vehicle 1 or appropriately driving along the trajectory of the curve.

In order to estimate the moving direction of another vehicle 2, the degree of visual recognition of a steering wheel of another vehicle 2 (oncoming vehicle) is used in the present embodiment. While another vehicle 2 is moving in the direction toward the vehicle 1, a lateral side surface portion of a steering wheel of another vehicle 2 is almost invisible. On the other hand, while another vehicle 2 is not moving in the direction toward the vehicle 1, the lateral side surface portion of the steering wheel of another vehicle 2 is visibly recognized to a certain extent.

Figure 4:
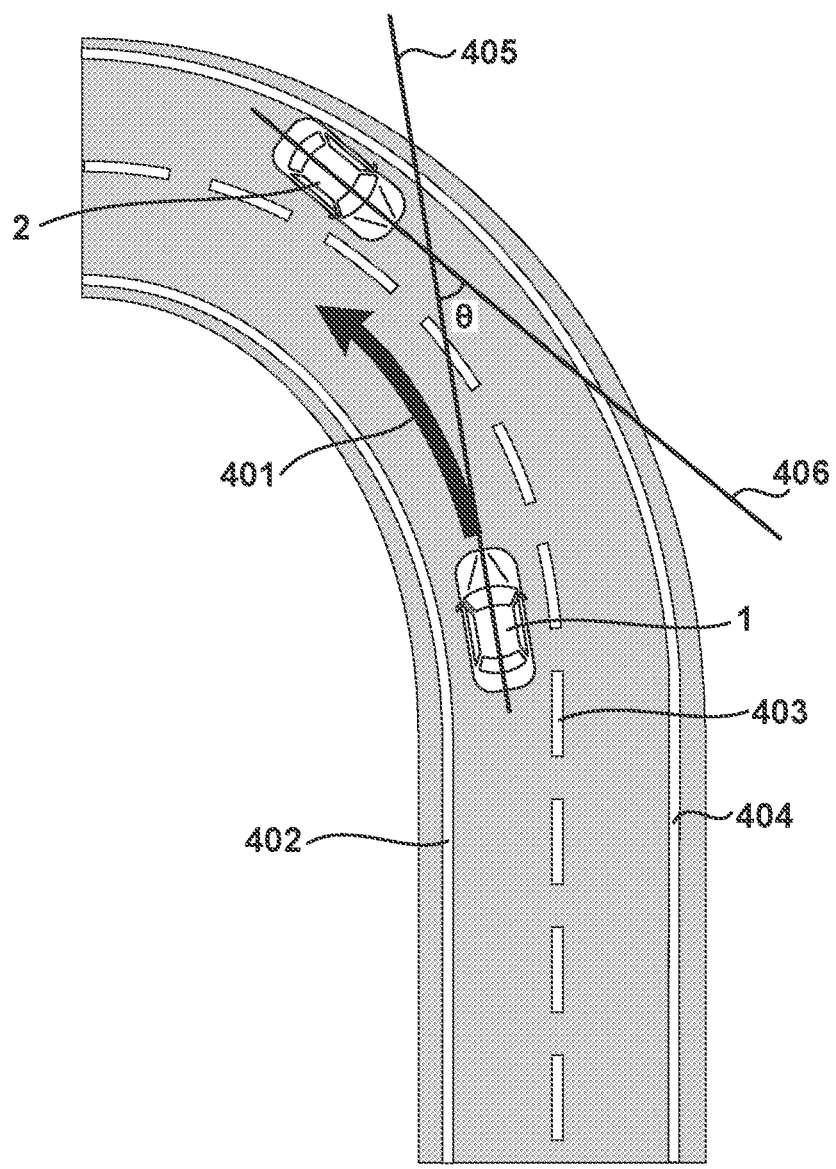
FIG. 4 is a diagram for describing a relationship between a vehicle and another vehicle while traveling on a curve according to an embodiment.

Note that in the example of FIG. 4, a case where the vehicle is traveling on a curve is taken as an example. However, the present invention is not limited to the case where the vehicle is traveling on a curve, and the present invention is applicable even while the vehicle is traveling on a straight road.

<Visual Recognition Ratio of Steering Wheel>

Figure 5:
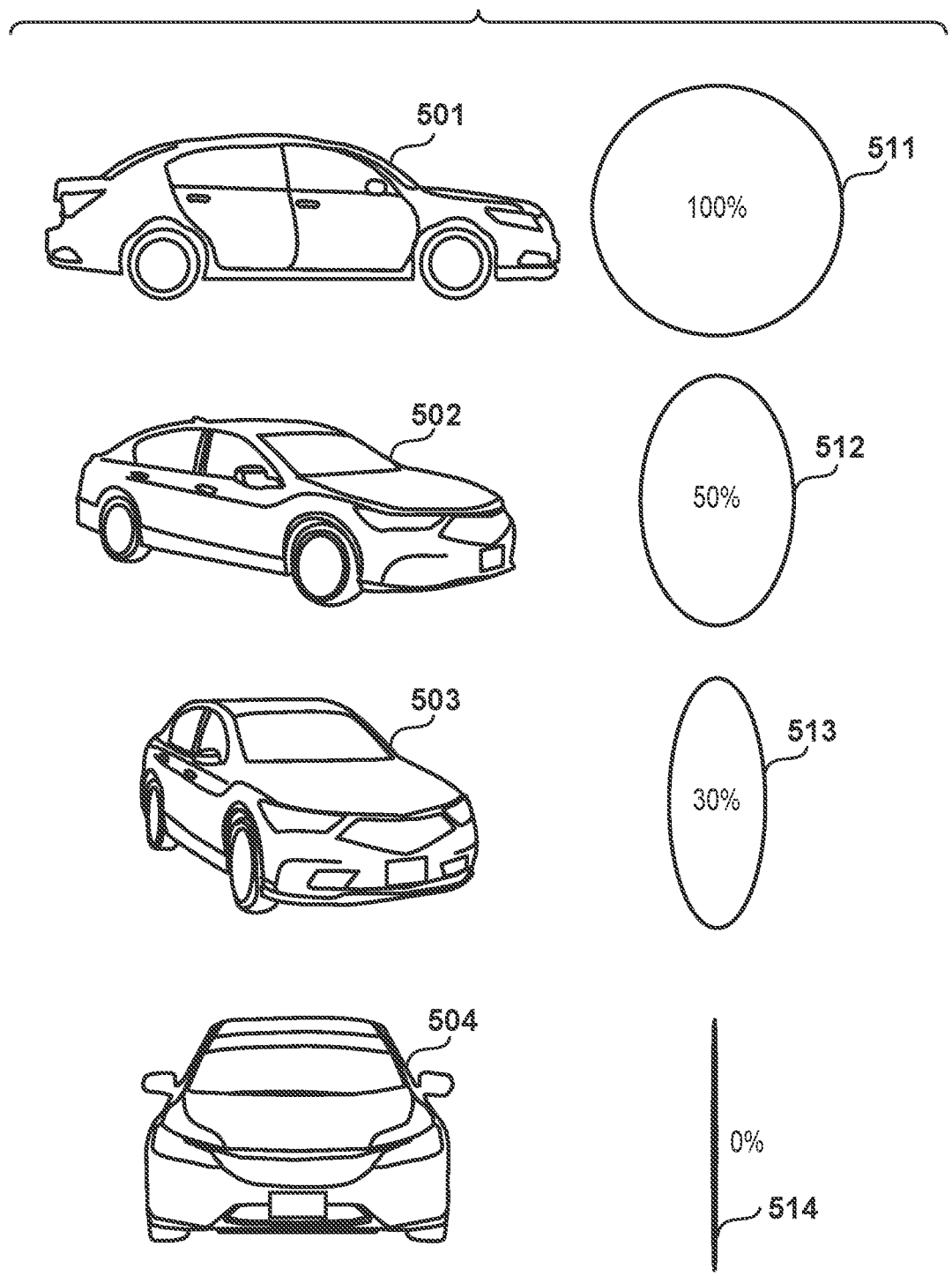
FIG. 5 is a diagram for describing a visual recognition ratio of a steering wheel of another vehicle to a perfect circle according to an embodiment.

FIG. 5 is a diagram for describing a visual recognition ratio of a steering wheel of another vehicle to a perfect circle according to an embodiment. A vehicle 501 is an example of a case where the vehicle is viewed from a lateral side. In this situation, a visually recognized shape of a steering wheel (a front wheel in the illustrated example) is a perfect circle, and a visual recognition ratio 511 is 100%. A vehicle 502 is an example of a case where the vehicle is visually recognized from an oblique direction. In this situation, the steering wheel has an elliptical shape instead of the perfect circle, and a visual recognition ratio 512 to the perfect circle is 50%. A vehicle 503 is an example of a case where the vehicle faces the front side as compared with the vehicle 502, but is viewed from an oblique direction similarly to the vehicle 502. In this situation, the steering wheel has an elliptical shape instead of the perfect circle, and a visual recognition ratio 513 to the perfect circle is 30%. A vehicle 504 is an example of a case where the vehicle is viewed from the front side. In this situation, the steering wheel has an approximately linear elliptical shape instead of the perfect circle, and a visual recognition ratio 514 to the perfect circle is approximately 0%.

Note that in the example of FIG. 5, the direction of the steering wheel and the direction of the vehicle body are parallel to each other. However, the direction of the steering wheel and the direction of the vehicle body are not necessarily parallel to each other while traveling on a curve. For example, while the vehicle is traveling on a curve as illustrated in FIG. 4, the steering wheels are facing the vehicle 1 side rather than the vehicle body direction of another vehicle 2 by the steering operation along the curve. By estimating the moving direction of another vehicle 2 from the orientation of the steering wheels rather than the vehicle body direction, it is possible to determine whether another vehicle 2 traveling on a curve is turning too much on the steering wheel and moving toward the vehicle 1 or is appropriately driven along the curve.

In addition, the steering wheel mentioned here may be a metal wheel part excluding a tire part, or may be the entirety of the tire part and the metal wheel part.

<Process>

Figure 3:
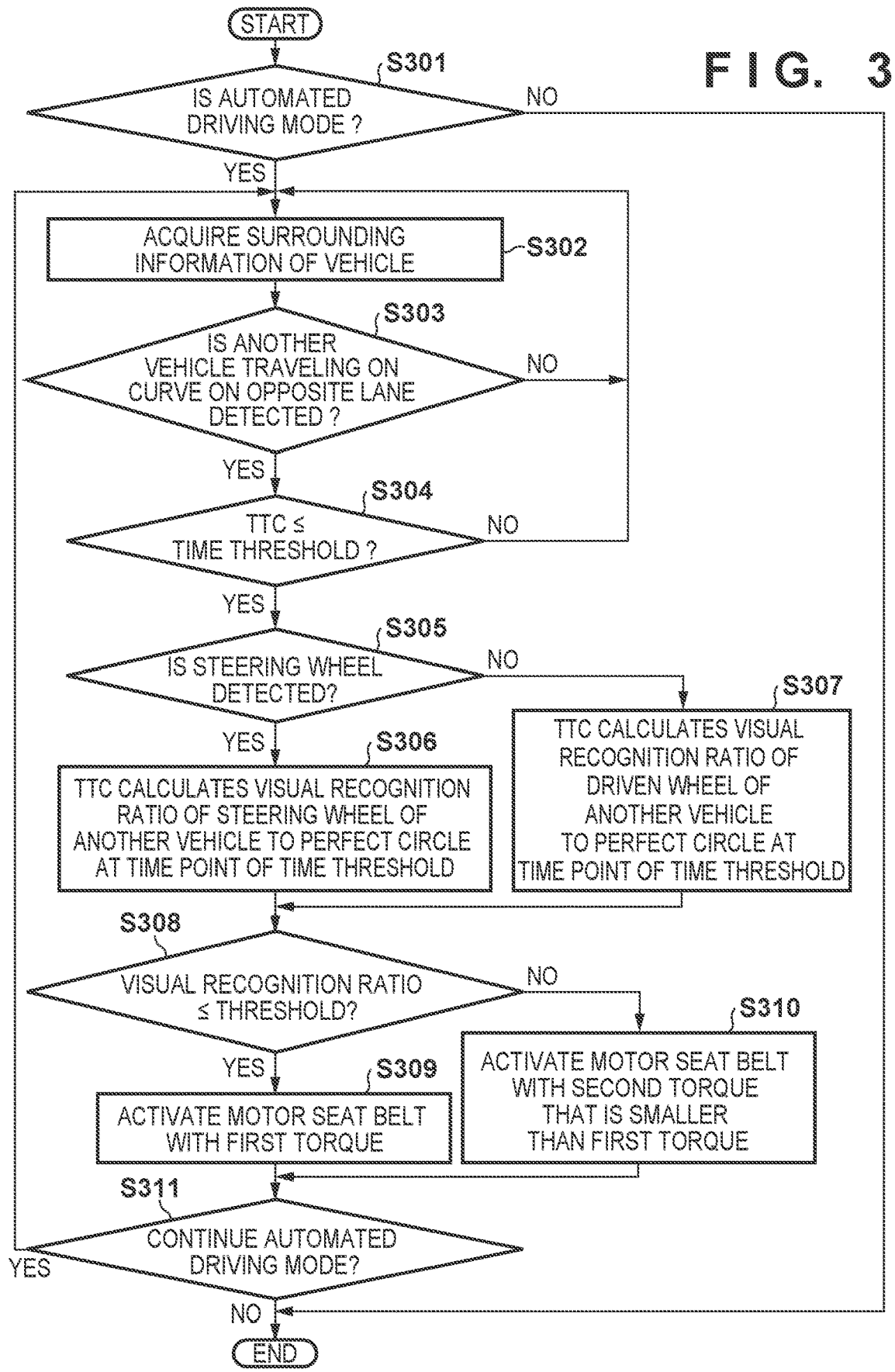
FIG. 3 is a flowchart illustrating an example of a procedure of a process performed by a vehicle control device according to a first embodiment.

Next, details of a process in the present embodiment will be described with reference to FIG. 3. FIG. 3 is a flowchart for describing an example of a procedure of the process according to the present embodiment.

First, step S301 in FIG. 3 (hereinafter, simply referred to as "S301". The same applies to other steps), the vehicle control device 13 determines whether the operation mode of the vehicle 1 is an automated driving mode. In a case of the automated driving mode, the process proceeds to S302, and in the other case (in a case of a normal mode in which the driver performs all the driving operations), this flow ends. Note that switching between the normal mode and the automated driving mode as the operation mode of the vehicle 1 can be conducted by a driver (alternatively, a person who can be a driver when the automated driving is canceled) pushing a predetermined switch in the vehicle.

In S302, the vehicle control device 13 acquires surrounding information of the vehicle 1. This step is performed by the ECU 134 of the vehicle control device 13 acquiring the surrounding information of the vehicle 1 that has been detected by the surroundings monitoring device 12. The vehicle control device 13 controls the operations (acceleration, braking, and/or steering) of the vehicle 1, based on the surrounding information.

In S303, the vehicle control device 13 recognizes another vehicle 2 traveling in the surroundings of the vehicle 1, based on the surrounding information. Then, while traveling on a curve, it is determined whether another vehicle 2 traveling on the opposite lane of the traveling lane in which the vehicle 1 is traveling is detected. For example, a scene illustrated in FIG. 4 is assumed. In a case where another vehicle 2 is detected, the process proceeds to S304. On the other hand, in a case where another vehicle 2 is not detected, the process returns to S302.

In S304, the vehicle control device 13 determines whether a predicted time until a collision between the vehicle 1 and another vehicle 2 is equal to or shorter than a predetermined time threshold (for example, 400 ms). The predicted time here is, for example, Time-To-Collision (TTC), which is a value obtained by dividing the inter-vehicle distance between the vehicle 1 and another vehicle 2 by a relative speed. TTC is an index defined by in how many seconds the two vehicles collide with each other if the two vehicles travel at the angles and speeds at that time, without performing an avoidance action. TTC is configured to be successively calculated.

In a case where the predicted time is equal to or shorter than the predetermined time threshold, the process proceeds to S305. On the other hand, in a case where the predicted time is not equal to or shorter than the predetermined time threshold, the process returns to S302.

In S305, the vehicle control device 13 determines whether a steering wheel of another vehicle 2 has been detected. In a case where the steering wheel has been detected, the process proceeds to S306. On the other hand, in a case where the steering wheel has not been detected, the process proceeds to S307.

In S306, the vehicle control device 13 calculates a visual recognition ratio of the steering wheel of another vehicle 2 to a perfect circle, when the predicted time is a time point of the predetermined time threshold. A method for calculating the visual recognition ratio can be performed by calculating an area ratio of a visually recognized elliptical shape to a perfectly circular shape. The height of the steering wheel in the vertical direction is the same even after the orientation of the steering wheel changes. Therefore, the radius of the perfect circle corresponding to the visually recognized ellipse can be calculated, and thus the area of the perfect circle corresponding to the ellipse can also be calculated. Note that the steering wheel can be recognized by analyzing a captured image and collating with data of the steering wheel that has been learned beforehand. In addition, whether it is either the steering wheel (front wheel) or the non-steering wheel (rear wheel, driven wheel) can also be determined by analyzing the captured image and identifying the orientation of the vehicle body.

In S307, the vehicle control device 13 calculates the visual recognition ratio of a driven wheel of another vehicle 2 to the perfect circle, when the predicted time is a time point of the predetermined time threshold. A calculation method is similar to the calculation method of the visual recognition ratio of the steering wheel to the perfect circle. Note that the driven wheel can be recognized by analyzing a captured image and collating with data of the driven wheel that has been learned beforehand. In addition, whether it is either the steering wheel (front wheel) or the non-steering wheel (rear wheel, driven wheel) can also be determined by analyzing the captured image and identifying the orientation of the vehicle body.

This is the control to recognize the rear wheel (driven wheel) as a backup operation and recognize the driven wheel similarly to the steering wheel, in a case where it is impossible to visually recognize the steering wheel for some reason (for example, there are a plurality of tall median strips or oncoming vehicles, and there is a vehicle the steering wheels of which cannot be visually recognized).

In S308, the vehicle control device 13 determines whether the visual recognition ratio calculated in S306 or S307 is equal to or smaller than a threshold (for example, 30%). In a case where the visual recognition ratio is equal to or smaller than the threshold, the process proceeds to S309. On the other hand, in a case where the visual recognition ratio is larger than the threshold, the process proceeds to S310. Note that the threshold of the visual recognition ratio of the steering wheel and the threshold of the visual recognition ratio of the driven wheel may be different from each other. The driven wheel is directed in substantially the same direction as the direction of the vehicle body. Hence, in a situation where another vehicle is moving toward the self-vehicle, the visual recognition ratio of the steering wheel is smaller than the visual recognition ratio of the driven wheel. Therefore, the threshold of the steering wheel can be set to a smaller value than the threshold of the driven wheel. For example, the threshold of the visual recognition ratio of the steering wheel may be set to 30%, and the threshold of the visual recognition ratio of the driven wheel may be set to 40%. However, the thresholds are not limited to these values.

In S309, the vehicle control device 13 activates a wind-up operation of the motor seat belt 17 with first torque.

In S310, the vehicle control device 13 activates the wind-up operation of the motor seat belt 17 with second torque that is smaller than the first torque. Note that in S310, control may be conducted not to activate the winding up of the motor seat belt 17.

In S309 and S310, control is conducted such that the motor seat belt 17 is wound up with strong torque in order to prepare for an impact in a case where the visual recognition ratio is small, another vehicle 2 is moving toward the vehicle 1, and there is a possibility of a collision, whereas in the other case, the motor seat belt 17 is wound up with weak torque.

In S311, the vehicle control device 13 determines whether the operation mode of the vehicle 1 continues the automated driving mode. In a case where the automated driving mode is to be continued, the process returns to S302, and in a case where the automated driving mode is not to be continued, this flow ends. Accordingly, a series of process illustrated in FIG. 3 ends.

As described above, in the present embodiment, another vehicle traveling in the surroundings of the vehicle is recognized, based on the surrounding information of the vehicle, and the visual recognition ratio of the steering wheel of another vehicle to the perfect circle is calculated. Then, the moving direction of another vehicle is estimated, based on the visual recognition ratio, or the vehicle is controlled, based on the visual recognition ratio.

Accordingly, it is possible to accurately recognize whether another vehicle is approaching the self-vehicle. Therefore, it is possible to achieve the control in consideration of a movement of another vehicle present in the surroundings of the self-vehicle.

[Modifications]

All the processes in the above-described flowcharts are not essential processes, and some of the processes may be configured not to be performed, or some processes may be replaced with other processes. For example, in the present embodiment, as an example of the control using the visual recognition ratio calculated in S306 or S307, the description has been given for an example of controlling the operation of the motor seat belt 17 of the vehicle 1 in S309 and S310. However, the present invention is not limited to this.

The object to be controlled based on the visual recognition ratio may be at least one of the drive mechanism 14, the braking mechanism 15, and the steering mechanism 16. For example, in a case where the visual recognition ratio is equal to or smaller than the threshold, it is determined that there is a possibility of a collision, and the drive mechanism 14 is activated to perform an acceleration operation, the braking mechanism 15 is activated to perform a braking operation, or the steering mechanism 16 is activated to perform a steering operation so that an avoidance action is conducted. In addition, in a case where the visual recognition ratio is equal to or smaller than the threshold, it is determined that there is a possibility of a collision, and an alarm device, not illustrated, may be controlled to notify that there is a possibility of a collision. Furthermore, some or all of the above-described control may be conducted in combination.

Further, the control target does not have to be controlled in accordance with the visual recognition ratio, and the moving direction of another vehicle 2 may be estimated, based on the visual recognition ratio. In such a situation, the moving direction may be notified to the driver of the vehicle 1 to call attention.

In addition, in a case where neither the steering wheel nor the driven wheel is detectable, the orientation (moving direction) of the vehicle body may be estimated from the captured image, and the activation of the motor seat belt may be controlled, based on the orientation. For example, an angle formed by the orientation of the self-vehicle and the orientation of another vehicle may be calculated, and in a case where the angle is equal to or smaller than a threshold, the motor seat belt may be activated with the first torque, and in a case where the angle is larger than the threshold, the motor seat belt may be activated with the second torque that is smaller than the first torque.

Second Embodiment

In the first embodiment, the description has been given for an example in which the moving direction of another vehicle is estimated, based on the visual recognition ratio of the steering wheel, and vehicle control is conducted in accordance with the estimated moving direction. In the present embodiment, a description will be given for an example in which in a case where the visual recognition ratio of the steering wheel is equal to or smaller than a threshold, the orientation of the vehicle (vehicle body) of another vehicle 2 is further calculated from a captured image, and an angle difference between the self-vehicle 1 and another vehicle 2 is calculated, so that whether another vehicle 2 is actually moving toward the vehicle 1 is estimated with more accuracy. The device configuration and the like are similar to those in the first embodiment, and their descriptions will be omitted.

<Process>

A procedure of a process performed by the vehicle control device 13 according to the present embodiment will be described with reference to a flowchart of FIGS. 6A and 6B. The same step numbers are assigned to similar processes to those described with reference to FIG. 3, and the detailed descriptions will be omitted. Hereinafter, differences from the first embodiment will be mainly described.

Figure 6A:
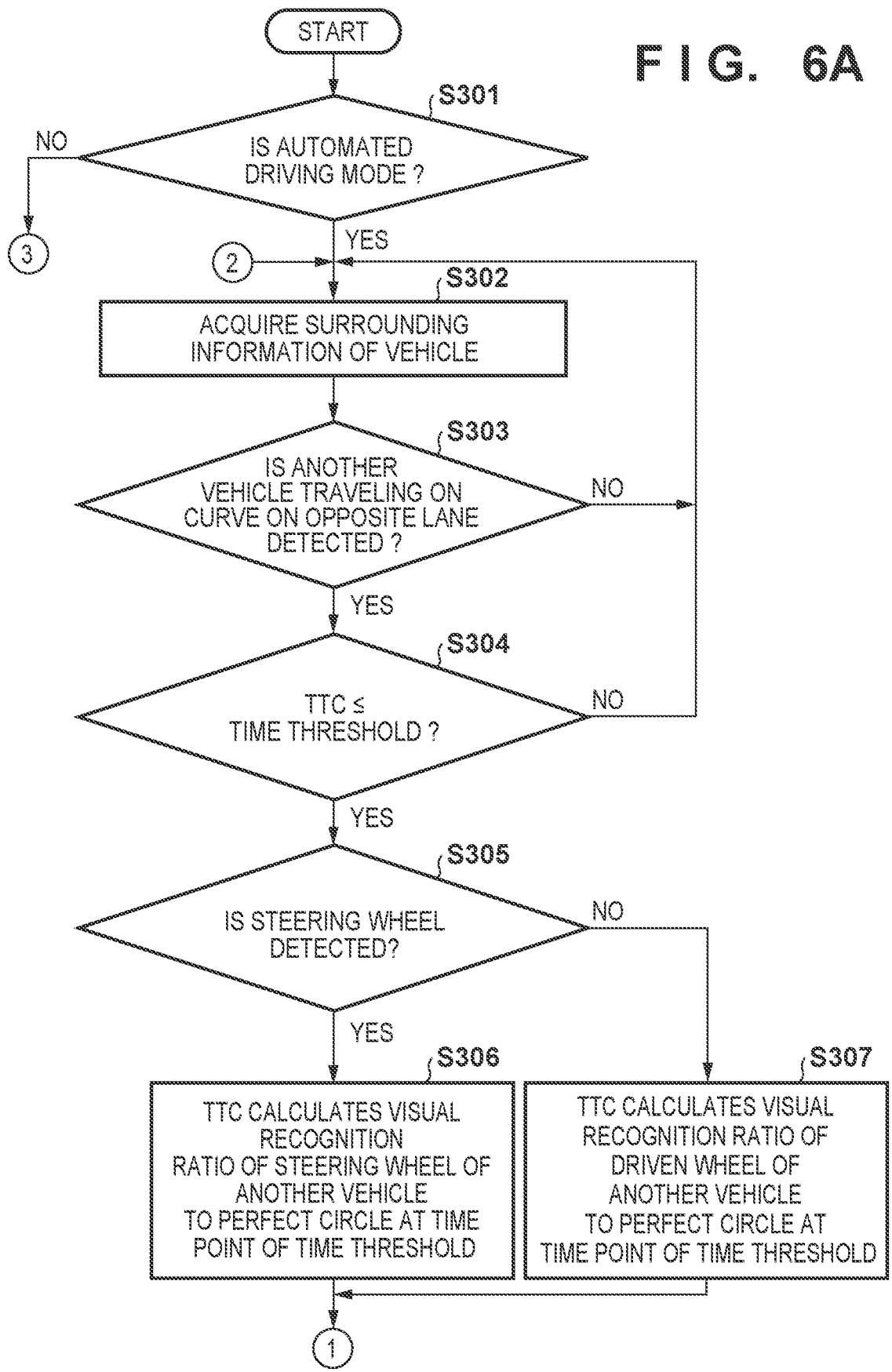

In an example of FIGS. 6A and 6B, in a case where the visual recognition ratio is equal to or smaller than the threshold in S308, the process proceeds to S601, and in a case where the visual recognition ratio is larger than the threshold, the process proceeds to S310.

In S601, the vehicle control device 13 determines whether the predicted time until the collision between the vehicle 1 and another vehicle 2 is equal to or shorter than a predetermined second time threshold (for example, 200 ms). In a case where the predicted time is equal to or shorter than the predetermined second time threshold, the process proceeds to S602. On the other hand, in a case where the predicted time is not equal to or shorter than the predetermined second time threshold, the process returns to S310.

In S602, the vehicle control device 13 calculates the orientation of another vehicle 2 (the orientation of the vehicle body) at the time point of the second time threshold, based on the surrounding information. Here, a captured image is analyzed to calculate the orientation of the entire vehicle body of another vehicle 2, instead of the visual recognition ratio of the steering wheel. The predicted time is relatively short, that is, the possibility of a collision is increasing. Hence, the orientation of the entire vehicle body of another vehicle 2 is calculated, instead of the steering wheel of another vehicle 2, so that whether another vehicle 2 is actually moving toward the vehicle 1 can be recognized with accuracy.

In S603, the vehicle control device 13 calculates an angle difference between the vehicle 1 and another vehicle, and determines whether the calculated angle difference is equal to or smaller than a predetermined angle (for example, 10 degrees). In the example of FIG. 4, the angle difference is an angle θ formed by an orientation 405 of the vehicle body of the vehicle 1 and an orientation 406 of the vehicle body of another vehicle 2. In a case where the angle difference is equal to or smaller than the predetermined angle, the process proceeds to S309. On the other hand, in a case where the angle difference is larger than the predetermined angle, the process proceeds to S310.

As described heretofore, in the present embodiment, in a case where the predicted time until a collision is equal to or shorter than the threshold, the angle difference between the self-vehicle and another vehicle is calculated. In a case where the angle difference is equal to or smaller than the predetermined angle, it is determined that there is a possibility of a collision, and the motor seat belt is wound up with relatively strong torque.

Accordingly, the determination with higher accuracy is enabled in consideration of the orientations of the vehicle bodies, and thus, excessive winding up of the motor seat belt can be suppressed.

(Other Embodiments)

In addition, a program for achieving one or more functions that have been described in each of the embodiments is supplied to a system or apparatus through a network or a storage medium, and one or more processors in a computer of such a system or apparatus are capable of reading and executing the program. The present invention is also achievable by such an aspect.

<Summary of Embodiments>

1. A vehicle control device in the above embodiment is a vehicle control device (for example, 13) that controls a vehicle (for example, 1), the vehicle control device includes:
   an acquisition unit (for example, 12, 134) configured to acquire surrounding information of the vehicle;
   a recognition unit (for example, 134) configured to recognize another vehicle (for example, 2) traveling in surroundings of the vehicle, based on the surrounding information;
   a calculation unit (for example, 134) configured to calculate a visual recognition ratio of a steering wheel of the other vehicle to a perfect circle; and
   a control unit (for example, 131 to 134) configured to control the vehicle, based on the visual recognition ratio.

Accordingly, the control in consideration of a movement of another vehicle present in the surroundings of the vehicle is achievable. In particular, the visual recognition ratio of the steering wheel of another vehicle is used as an index of whether or not another vehicle is moving toward the self-vehicle, so that appropriate vehicle control in accordance with the situation is enabled.

2. In the vehicle control device in the above embodiment, the control unit controls an operation of a motor seat belt (for example, 17) of the vehicle, based on the visual recognition ratio.

Accordingly, in a case where another vehicle is moving toward the self-vehicle, the motor seat belt can be adaptively controlled.

3. In the vehicle control device in the above embodiment, in a case where the visual recognition ratio is equal to or smaller than a threshold, the control unit controls winding up of the motor seat belt with first torque.

Accordingly, in a case where another vehicle is moving toward the self-vehicle, the wind-up operation of the motor seat belt is automatically performed, so that the safety of occupants can be improved.

4. In the vehicle control device in the above embodiment, in a case where the visual recognition ratio is larger than the threshold, the control unit controls winding up of the motor seat belt with second torque that is smaller than the first torque.

Accordingly, in a case where another vehicle is not moving toward the self-vehicle, but there is a possibility of it, the wind-up operation of the motor seat belt is performed with smaller torque, so that the safety of occupants can be improved while excessive winding up being suppressed.

5. The vehicle control device in the above embodiment, further include an estimation unit (for example, 134) configured to estimate a predicted time until a collision between the vehicle and the other vehicle, based on the surrounding information, in which the calculation unit calculates the visual recognition ratio, in a case where the predicted time is equal to or smaller than a first time threshold (for example, 400 ms).

Accordingly, in a case where the possibility of a collision is considered to be low, the visual recognition ratio is not calculated, so that the processing load can be reduced.

6. The vehicle control device in the above embodiment further includes:
   a determination unit (for example, 134) configured to determine whether or not the predicted time is equal to or shorter than a second time threshold (for example, 200 ms) smaller than the first time threshold, in a case where the visual recognition ratio is equal to or smaller than the threshold; and
   a deriving unit (for example, 134) configured to calculate an orientation of a vehicle body of the other vehicle, based on the surrounding information, and configured to derive an angle difference in a traveling direction between the vehicle and the other vehicle, in a case where the predicted time is equal to or shorter than the second time threshold, in which
   in a case where the angle difference is equal to or smaller than a predetermined angle, the control unit controls winding up of the motor seat belt with the first torque.

Accordingly, in consideration of not only the steering wheel but also the orientation of the vehicle body, it is possible to more accurately recognize that another vehicle is approaching the self-vehicle. Therefore, the motor seat belt can be wound up only in a case where the possibility of a collision is higher, so that excessive winding up can be suppressed.

7. In the vehicle control device in the above embodiment, in a case where the angle difference is larger than the predetermined angle, the control unit controls winding up of the motor seat belt with second torque that is smaller than the first torque.

Accordingly, in a case where the angle difference between the self-vehicle and another vehicle is large to some extent and the possibility of a collision is not considered to be high, the wind-up operation of the motor seat belt is performed with smaller torque, so that the safety of occupants can be improved while excessive winding up is being suppressed.

8. The vehicle control device in the above embodiment further includes
a curve determination unit (for example, 134) configured to determine whether or not the other vehicle is traveling on a curve, in which
in a case where the other vehicle is traveling on the curve, the calculation unit calculates the visual recognition ratio.

Accordingly, the possibility of a collision with another vehicle can be determined with high accuracy, while the vehicle is traveling on a curve.

9. In the vehicle control device in the above embodiment, the calculation unit calculates a visual recognition ratio of a driven wheel of the other vehicle to the perfect circle, in a case where no steering wheel is detected.

Accordingly, in a case where the steering wheel is not detectable, control using information of the driven wheel can be performed as a backup operation.

10. An information processing apparatus in the above embodiment is an information processing apparatus (for example, 13, 134) disposed in a vehicle (for example, 1), information processing apparatus includes:
an acquisition unit (for example, 134) configured to acquire surrounding information of the vehicle;
a recognition unit (for example, 134) configured to recognize another vehicle traveling in surroundings of the vehicle, based on the surrounding information;
a calculation unit (for example, 134) configured to calculate a visual recognition ratio of a steering wheel of the other vehicle to a perfect circle; and
an estimation unit (for example, 134) configured to estimate a moving direction of the other vehicle, based on the visual recognition ratio.

Accordingly, a movement of another vehicle present in the surroundings of the vehicle can be estimated with high accuracy.

11. An operation method of the vehicle control device in the above embodiment is
an operation method of a vehicle control device (for example, 13) that controls a vehicle (for example, 1), the operation method including:
acquiring surrounding information of the vehicle (for example, S302);
recognizing another vehicle (for example, 2) traveling in surroundings of the vehicle, based on the surrounding information (for example, S303);
calculating a visual recognition ratio of a steering wheel of the other vehicle to a perfect circle (for example, S306); and
controlling the vehicle, based on the visual recognition ratio (for example, S308 to S310).

Accordingly, the control in consideration of a movement of another vehicle present in the surroundings of the vehicle is achievable. In particular, the visual recognition ratio of the steering wheel of another vehicle is used as an index of whether or not another vehicle is moving toward the self-vehicle, so that appropriate vehicle control in accordance with the situation is enabled.

12. An operation method of the information processing apparatus in the above embodiment is
an operation method of an information processing apparatus (for example, 13, 134) disposed in a vehicle (for example, 1), the operation method including:
acquiring surrounding information of the vehicle (for example, S302);
recognizing another vehicle traveling in surroundings of the vehicle, based on the surrounding information (for example, S303);
calculating a visual recognition ratio of a steering wheel of the other vehicle to a perfect circle (for example, S306); and
estimating a moving direction of the other vehicle, based on the visual recognition ratio.

Accordingly, a movement of another vehicle present in the surroundings of the vehicle can be estimated with high accuracy.

13. A non-transitory computer-readable storage medium in the above embodiment is
a non-transitory computer-readable storage medium storing a program for causing a computer to function as a vehicle control device according to one of the above embodiments.

Accordingly, the process of the vehicle control device is achievable by the computer.

14. A non-transitory computer-readable storage medium in the above embodiment is
a non-transitory computer-readable storage medium storing a program for causing a computer to function as an information processing apparatus described in the above embodiments.

Accordingly, the process of the information processing apparatus is achievable by the computer.

Accordingly, the control in consideration of a movement of another vehicle present in the surroundings of the vehicle is achievable.

The invention is not limited to the foregoing embodiments, and various variations/changes are possible within the spirit of the invention.

What is claimed is:

1. A vehicle control device that controls a vehicle, the vehicle control device comprising:
at least one memory configured to store instructions; and
at least one processor configured to execute the instructions to:
acquire surrounding information of the vehicle;
recognize another vehicle traveling in surroundings of the vehicle, based on the surrounding information;
determine whether or not the other vehicle is traveling on a curve;
calculate a visual recognition ratio of a steering wheel of the other vehicle to a perfect circle, in a case where the other vehicle is traveling on the curve; and
control the vehicle, based on the visual recognition ratio.

2. The vehicle control device according to claim 1, wherein the at least one processor further executes the instructions to control an operation of a motor seat belt of the vehicle, based on the visual recognition ratio.

3. The vehicle control device according to claim 2, wherein in a case where the visual recognition ratio is equal to or smaller than a threshold, the at least one processor further executes the instructions to control winding up of the motor seat belt with first torque.

4. The vehicle control device according to claim 3, wherein in a case where the visual recognition ratio is larger than the threshold, the at least one processor further executes the instructions to control winding up of the motor seat belt with second torque that is smaller than the first torque.

5. The vehicle control device according to claim 3, wherein the at least one processor further executes the instructions to:
- estimate a predicted time until a collision between the vehicle and the other vehicle, based on the surrounding information; and
- calculate the visual recognition ratio, in a case where the predicted time is equal to or smaller than a first time threshold.

6. The vehicle control device according to claim 5, wherein the at least one processor further executes the instructions to:
- determine whether or not the predicted time is equal to or shorter than a second time threshold smaller than the first time threshold, in a case where the visual recognition ratio is equal to or smaller than the threshold;
- calculate an orientation of a vehicle body of the other vehicle, based on the surrounding information, and derive an angle difference in a traveling direction between the vehicle and the other vehicle, in a case where the predicted time is equal to or shorter than the second time threshold and
- in a case where the angle difference is equal to or smaller than a predetermined angle, control winding up of the motor seat belt with the first torque.

7. The vehicle control device according to claim 6, wherein in a case where the angle difference is larger than the predetermined angle, the at least one processor further executes the instructions to control winding up of the motor seat belt with second torque that is smaller than the first torque.

8. The vehicle control device according to claim 1, wherein the at least one processor further executes the instructions to calculate a visual recognition ratio of a driven wheel of the other vehicle to the perfect circle, in a case where no steering wheel is detected.

9. An information processing apparatus disposed in a vehicle, the information processing apparatus comprising:
- at least one memory configured to store instructions; and
- at least one processor configured to execute the instructions to:
  - acquire surrounding information of the vehicle;
  - recognize another vehicle traveling in surroundings of the vehicle, based on the surrounding information;
  - determine whether or not the other vehicle is traveling on a curve;
  - calculate a visual recognition ratio of a steering wheel of the other vehicle to a perfect circle, in a case where the other vehicle is traveling on the curve; and
  - estimate a moving direction of the other vehicle, based on the visual recognition ratio.

10. An operation method of a vehicle control device that controls a vehicle, the operation method comprising:
- acquiring surrounding information of the vehicle;
- recognizing another vehicle traveling in surroundings of the vehicle, based on the surrounding information;
- determining whether or not the other vehicle is traveling on a curve;
- calculating a visual recognition ratio of a steering wheel of the other vehicle to a perfect circle, in a case where the other vehicle is traveling on the curve; and
- controlling the vehicle, based on the visual recognition ratio.

11. An operation method of an information processing apparatus disposed in a vehicle, the operation method comprising:
- acquiring surrounding information of the vehicle;
- recognizing another vehicle traveling in surroundings of the vehicle, based on the surrounding information;
- determining whether or not the other vehicle is traveling on a curve;
- calculating a visual recognition ratio of a steering wheel of the other vehicle to a perfect circle, in a case where the other vehicle is traveling on the curve; and
- estimating a moving direction of the other vehicle, based on the visual recognition ratio.

12. A non-transitory computer-readable storage medium storing a program for causing a computer to execute an operation method of a vehicle control device that controls a vehicle, the operation method comprising:
- acquiring surrounding information of the vehicle;
- recognizing another vehicle traveling in surroundings of the vehicle, based on the surrounding information;
- determining whether or not the other vehicle is traveling on a curve;
- calculating a visual recognition ratio of a steering wheel of the other vehicle to a perfect circle, in a case where the other vehicle is traveling on the curve; and
- controlling the vehicle, based on the visual recognition ratio.

13. A non-transitory computer-readable storage medium storing a program for causing a computer to execute an operation method of an information processing apparatus disposed in a vehicle, the operation method comprising:
- acquiring surrounding information of the vehicle;
- recognizing another vehicle traveling in surroundings of the vehicle, based on the surrounding information;
- determining whether or not the other vehicle is traveling on a curve;
- calculating a visual recognition ratio of a steering wheel of the other vehicle to a perfect circle, in a case where the other vehicle is traveling on the curve; and
- estimating a moving direction of the other vehicle, based on the visual recognition ratio.

* * * * *